United States Patent
Chang et al.

(10) Patent No.: US 11,854,554 B2
(45) Date of Patent: Dec. 26, 2023

(54) METHOD AND APPARATUS FOR COMBINED LEARNING USING FEATURE ENHANCEMENT BASED ON DEEP NEURAL NETWORK AND MODIFIED LOSS FUNCTION FOR SPEAKER RECOGNITION ROBUST TO NOISY ENVIRONMENTS

(71) Applicant: IUCF-HYU (INDUSTRY-UNIVERSITY COOPERATION FOUNDATION HANYANG UNIVERSITY), Seoul (KR)

(72) Inventors: Joon-Hyuk Chang, Seoul (KR); Joonyoung Yang, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 168 days.

(21) Appl. No.: 17/441,755

(22) PCT Filed: Mar. 30, 2020

(86) PCT No.: PCT/KR2020/004281
§ 371 (c)(1),
(2) Date: Sep. 22, 2021

(87) PCT Pub. No.: WO2020/256257
PCT Pub. Date: Dec. 24, 2020

(65) Prior Publication Data
US 2022/0199095 A1 Jun. 23, 2022

(30) Foreign Application Priority Data
Jun. 21, 2019 (KR) .......................... 10-2019-0073925

(51) Int. Cl.
*G10L 17/20* (2013.01)
*G06N 3/08* (2023.01)
(Continued)

(52) U.S. Cl.
CPC ................. *G10L 17/20* (2013.01); *G06N 3/08* (2013.01); *G10L 17/02* (2013.01); *G10L 17/04* (2013.01);
(Continued)

(58) Field of Classification Search
CPC ......... G10L 17/20; G10L 17/02; G10L 17/04; G10L 17/06; G10L 17/18; G10L 21/0232;
(Continued)

(56) References Cited

U.S. PATENT DOCUMENTS 10,839,822 B2 * 11/2020 Chen ....................... G10L 25/30

FOREIGN PATENT DOCUMENTS

| KR | 10-2017-0119152 A | 10/2017 |
| KR | 10-2017-0131585 A | 11/2017 |
| WO | 2017/165551 A1 | 9/2017 |

OTHER PUBLICATIONS

Marc Delcroix, et al., "Strategies for distant speech recognition in reverberant environments", EURASIP Journal on Advances in Signal Processing, Jul. 19, 2015, pp. 1-15.
(Continued)

*Primary Examiner* — Huyen X Vo
*Assistant Examiner* — Edward Tracy, Jr.
(74) *Attorney, Agent, or Firm* — Sughrue Mion, PLLC

(57) ABSTRACT

Presented are a combined learning method and device using a transformed loss function and feature enhancement based on a deep neural network for speaker recognition that is robust to a noisy environment. The combined learning method using the transformed loss function and the feature enhancement based on the deep neural network for speaker
(Continued)

recognition that is robust to the noisy environment, according to an embodiment, may comprise: a preprocessing step for learning to receive, as an input, a speech signal and remove a noise or reverberation component by using at least one of a beamforming algorithm and a dereverberation algorithm using the deep neural network; a speaker embedding step for learning to classify an utterer from the speech signal, from which a noise or reverberation component has been removed, by using a speaker embedding model based on the deep neural network; and a step for, after connecting a deep neural network model included in at least one of the beamforming algorithm and the dereverberation algorithm and the speaker embedding model, for speaker embedding, based on the deep neural network, performing combined learning by using a loss function.

4 Claims, 3 Drawing Sheets

(51) Int. Cl.
    *G10L 17/02*    (2013.01)
    *G10L 17/04*    (2013.01)
    *G10L 17/06*    (2013.01)
    *G10L 17/18*    (2013.01)
    *G10L 21/0232*  (2013.01)
    *G10L 25/18*    (2013.01)
    *G10L 21/0208*  (2013.01)
(52) U.S. Cl.
    CPC .............. *G10L 17/06* (2013.01); *G10L 17/18* (2013.01); *G10L 21/0232* (2013.01); *G10L 25/18* (2013.01); *G10L 2021/02082* (2013.01)
(58) Field of Classification Search
    CPC .. G10L 25/18; G10L 2021/02082; G06N 3/08
    See application file for complete search history.

(56) References Cited

OTHER PUBLICATIONS

David Snyder, et al., "X-Vectors: Robust DNN Embeddings for Speaker Recognition", IEEE, ICASSP, Apr. 15-20, 2018, pp. 5329-5333.
Ladislav Mosner, et al., "Dereverberation and Beamforming in Robust Far-Field Speaker Recognition", Interspeech, Sep. 2-6, 2018, pp. 1334-1338.
International Search Report for PCT/KR2020/004281 dated Jan. 20, 2021 (PCT/ISA/210).

\* cited by examiner

METHOD AND APPARATUS FOR COMBINED LEARNING USING FEATURE ENHANCEMENT BASED ON DEEP NEURAL NETWORK AND MODIFIED LOSS FUNCTION FOR SPEAKER RECOGNITION ROBUST TO NOISY ENVIRONMENTS

CROSS REFERENCE TO RELATED APPLICATIONS

This application is a National Stage of International Application No. PCT/KR2020/004281 filed Mar. 30, 2020, claiming priority based on Korean Patent Application No. 10-2019-0073925 filed Jun. 21, 2019.

TECHNICAL FIELD

The following embodiments relate to a joint training method and apparatus using feature enhancement based on a deep neural network and a modified loss function for speaker recognition robust against noise environments.

BACKGROUND ART

Speaker verification is a problem for determining whether given two pieces of utterance are identical with two pieces of utterance spoken by a speaker, and is based on a speaker embedding technology for extracting a speaker feature vector having a fixed length from each piece of utterance having a given length. In particular, a deep neural network (DNN)-based speaker embedding technology is recently used a lot instead of the I-vector-based speaker embedding technology that has been conventionally most used.

The deep neural network is also used in various ways as a base technology for implementing various voice processing technologies not the speaker embedding technology. One of deep neural networks is a pre-processing technology for further facilitating the processing of a voice signal by removing noise and reverberation components from a multi-channel voice signal degraded by background noise and reverberation. In this case, a technology for removing noise from the multi-channel voice signal inputted to a microphone may be called beamforming. A technology for removing reverberation may be called dereverberation. As described above, a deep neural network may be used as part of beamforming and dereverberation algorithms.

Conventionally, speaker verification experiments based on an I-vector are performed by using beamforming and dereverberation modules based on a deep neural network as a pre-processing technology (non-Patent Document 1). In this case, the existing I-vector is used without using a speaker embedding technology based on a deep neural network. However, the I-vector has a disadvantage in that performance of an environment in which background noise and reverberation are present is degraded compared to the speaker embedding technology based on a deep neural network. Furthermore, joint training with the beamforming and dereverberation modules using a deep neural network is impossible because the I-vector is used. Furthermore, joint training with the dereverberation algorithm cannot be performed because the existing dereverberation algorithm not dependent on a deep neural network is used without using the dereverberation algorithm using a deep neural network.

As described above, in the case of the existing technology, to maximize performance when a pre-processing module at a front end and a speaker recognition module at a back end are combined through joint training is impossible because a beamforming algorithm using a deep neural network is used at the front end, but the speaker embedding technology based on an I-vector is used at the back end. Furthermore, improvement of performance through joint training in the existing technology cannot be checked because the dereverberation technology using a deep neural network is not used.

(Non-Patent Document 1) L. Mosner, P. Matejka, O. Novotny, and J. H. Cernocky, "Dereverberation and beamforming in robust far-field speaker recognition", Interspeech, 2018.

DISCLOSURE

Technical Problem

Embodiments describe a joint training method and apparatus using feature enhancement based on a deep neural network and a modified loss function for speaker recognition robust against noise environments and, more specifically, provide a joint training technology for maximizing combined efficiency of a pre-processing module and a speaker embedding module by using, as a pre-processing technology of a speaker verification technology, beamforming and dereverberation technologies using a deep neural network and training a speaker embedding network based on a deep neural network by using a signal from which noise and reverberation have been removed.

Embodiments provide a joint training method and apparatus capable of maximizing performance of speaker verification by jointly training a deep neural network model and an x-vector model for speaker embedding included in beamforming and dereverberation algorithms by using a loss function suitable for speaker embedding in a way to use, at a front, the beamforming and dereverberation algorithms using a deep neural network end and to use an x-vector model, that is, a speaker embedding model based on a deep neural network, at a back end.

Technical Solution

A joint training method using feature enhancement based on a deep neural network and a modified loss function for speaker recognition robust against noise environments according to an embodiment may include a pre-processing step of receiving a voice signal and learning to remove a noise or reverberation component by using at least one of a beamforming algorithm and a dereverberation algorithm using a deep neural network, a speaker embedding step of learning to classify speakers in the voice signal from which a noise or reverberation component has been removed by using a speaker embedding model based on a deep neural network, and a step of joint-training a deep neural network model and the speaker embedding model based on the deep neural network for speaker embedding, which are included in at least one of the beamforming algorithm and the dereverberation algorithm, by using a loss function after connecting the deep neural network model and the speaker embedding model.

The pre-processing step may be a step of learning to remove the noise component from the received voice signal by using a minimum variance distortionless response (MVDR) beamformer using a deep neural network. The step of joint training may be a step of joint-training the MVDR beamformer using the deep neural network and the speaker embedding model based on the deep neural network by using the loss function after connecting the MVDR beamformer and the speaker embedding model.

Furthermore, the pre-processing step may be a step of learning to remove the reverberation component from the received voice signal by using a weighted prediction error (WPE) dereverberation algorithm using a deep neural network. The step of joint training may be a step of joint-training the WPE dereverberation algorithm using the deep neural network and the speaker embedding model based on the deep neural network by using the loss function after connecting the WPE dereverberation algorithm and the speaker embedding model.

Furthermore, the pre-processing step may include steps of learning to remove the reverberation component from the received voice signal by using a weighted prediction error (WPE) dereverberation algorithm using a deep neural network, and learning to remove the noise component from the received voice signal by using a minimum variance distortionless response (MVDR) beamformer using a deep neural network. The step of joint training may include joint-training the WPE dereverberation algorithm using the deep neural network, the MVDR beamformer using the deep neural network and the speaker embedding model based on the deep neural network by using the loss function after connecting the WPE dereverberation algorithm, the MVDR beamformer and the speaker embedding model.

The speaker embedding step may include learning to classify the speakers in a sequence of acoustic features extracted from utterance having a given length by using an x-vector model which is the speaker embedding model based on the deep neural network.

The speaker embedding step may include learning using a cross-entropy loss function in a way to classify the speakers within a voice signal in an output layer of the x-vector model. The step of joint training may include the joint training by using the loss function defined in the output layer of the x-vector model.

The pre-processing step may include transforming, into short-time Fourier transform (STFT) coefficients from which noise or reverberation has been removed, STFT coefficients of a microphone input signal degraded by the noise and reverberation when the microphone input signal passes through the beamforming algorithm or the dereverberation algorithm using the deep neural network.

The speaker embedding step may include extracting, from the STFT coefficients from which the noise or reverberation has been removed, a Mel filterbank energies (MFBE) feature to be used as an input to the speaker embedding model based on the deep neural network by using a Mel-filter bank (MFB).

The step of joint training may include connecting a pre-processing portion and a speaker embedding portion by delivering the extracted MFBE feature to an input layer of the speaker embedding model based on the deep neural network, and performing the joint training in a way to classify speaker IDs of respective pieces of utterance through the joint training.

A joint training apparatus using feature enhancement based on a deep neural network and a modified loss function for speaker recognition robust against noise environments according to another embodiment may include a pre-processing module configured to receive a voice signal and trained to remove a noise or reverberation component by using at least one of a beamforming algorithm and a dereverberation algorithm using a deep neural network, a speaker embedding module trained to classify speakers in the voice signal from which a noise or reverberation component has been removed by using a speaker embedding model based on a deep neural network, and a joint training unit configured to joint-train a deep neural network model and the speaker embedding model based on the deep neural network for speaker embedding, which are included in at least one of the beamforming algorithm and the dereverberation algorithm, by using a loss function after connecting the deep neural network model and the speaker embedding model.

The pre-processing module may be trained to remove the noise component from the received voice signal by using a minimum variance distortionless response (MVDR) beamformer using a deep neural network. The joint training unit may joint-train the MVDR beamformer using the deep neural network and the speaker embedding model based on the deep neural network by using the loss function after connecting the MVDR beamformer and the speaker embedding model.

Furthermore, the pre-processing module may be trained to remove the reverberation component from the received voice signal by using a weighted prediction error (WPE) dereverberation algorithm using a deep neural network. The joint training unit may joint-train the WPE dereverberation algorithm using the deep neural network and the speaker embedding model based on the deep neural network by using the loss function after connecting the WPE dereverberation algorithm and the speaker embedding model.

Furthermore, the pre-processing module may include a weighted prediction error (WPE) dereverberation algorithm using a deep neural network, which is trained to remove the reverberation component from the received voice signal, and a minimum variance distortionless response (MVDR) beamformer using a deep neural network, which is trained to remove the noise component from the received voice signal by using. The joint training unit joint-trains the WPE dereverberation algorithm using the deep neural network, the MVDR beamformer using the deep neural network and the speaker embedding model based on the deep neural network by using the loss function after connecting the WPE dereverberation algorithm, the MVDR beamformer and the speaker embedding model.

The speaker embedding module may be trained to classify the speakers in a sequence of acoustic features extracted from utterance having a given length by using an x-vector model which is the speaker embedding model based on the deep neural network.

The speaker embedding module may be trained using a cross-entropy loss function in a way to classify the speakers within a voice signal in an output layer of the x-vector model. The joint training unit may perform the joint training by using the loss function defined in the output layer of the x-vector model.

Advantageous Effects

According to embodiments, there can be provided the joint training technology for maximizing combined efficiency of the pre-processing module and the speaker embedding module by using, as a pre-processing technology of a speaker verification technology, beamforming and dereverberation technologies using a deep neural network and training a speaker embedding network based on a deep neural network by using a signal from which noise and reverberation have been removed.

According to embodiments, there can be provided the joint training method and apparatus capable of maximizing performance of speaker verification by jointly training the deep neural network model and the x-vector model for speaker embedding included in the beamforming and dereverberation algorithms by using a loss function suitable for speaker embedding in a way to use, at the front, the beamforming and dereverberation algorithms using a deep neural network end and to use the x-vector model, that is, a speaker embedding model based on a deep neural network, at a back end.

BEST MODE FOR INVENTION

Figure 1:
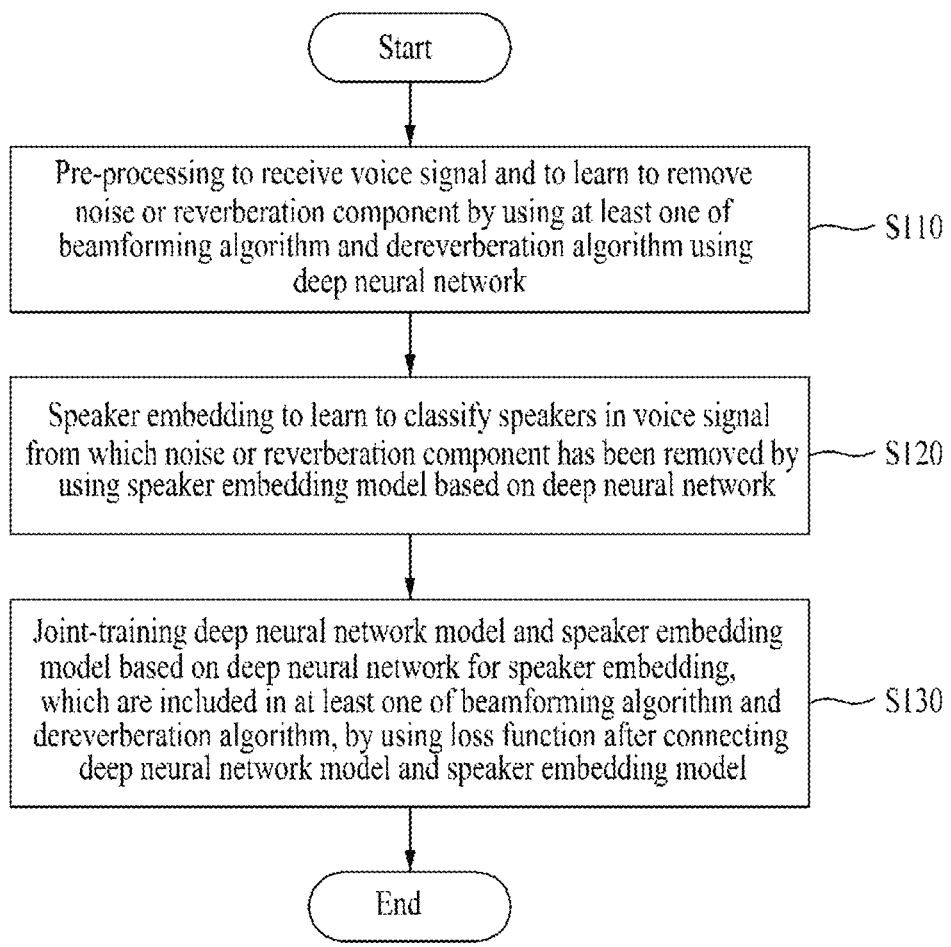
FIG. 1 is a flowchart illustrating a joint training method using feature enhancement based on a deep neural network and a modified loss function for speaker recognition robust against noise environments according to an embodiment.

Hereinafter, embodiments of the present disclosure are described with reference to the accompanying drawings. However, the described embodiments may be modified in various other forms, and the scope of the present disclosure is not restricted by the following embodiments. Furthermore, various embodiments are provided to more fully describe the present disclosure to a person having average knowledge in the art. The shapes, sizes, etc. of elements in the drawings may be exaggerated for a clear description.

The following embodiments propose a joint training method for maximizing combined efficiency of a pre-processing module and a speaker embedding module as a method of training a speaker embedding network based on a deep neural network (DNN) by using, as a pre-processing technology of a speaker verification technology, beamforming and dereverberation technologies using a deep neural network and using a signal from which noise and reverberation have been removed.

More specifically, according to embodiments, a multi-channel voice signal degraded by background noise and reverberation may be received. An expression of the corresponding voice signal may be transformed into a short-time Fourier transform (STFT) region in a time domain. Noise and a reverberation component may be removed by performing beamforming or dereverberation using a deep neural network or beamforming after dereverberation in the STFT region. Feature vectors for training a speaker embedding network may be extracted from the expression of the voice signal from which the noise and reverberation components have been removed in the STFT region. The speaker embedding network may be trained using the feature vectors. Finally, performance can be maximized by joint-training the entire speaker embedding module after the beamforming and dereverberation. In this case, the beamforming and dereverberation modules using a deep neural network needs to be previously trained using the multi-channel voice signal degraded by background noise and reverberation.

FIG. 1 is a flowchart illustrating a joint training method using feature enhancement based on a deep neural network and a modified loss function for speaker recognition robust against noise environments according to an embodiment.

Referring to FIG. 1, the joint training method using feature enhancement based on a deep neural network and a modified loss function for speaker recognition robust against noise environments according to an embodiment may include a pre-processing step S110 of receiving a voice signal and learning to remove a noise or reverberation component by using at least one of a beamforming algorithm and a dereverberation algorithm using a deep neural network, a speaker embedding step S120 of learning to classify speakers in the voice signal from which a noise or reverberation component has been removed by using a speaker embedding model based on a deep neural network, and a step S130 of joint-training a deep neural network model and the speaker embedding model based on the deep neural network for speaker embedding, which are included in at least one of the beamforming algorithm and the dereverberation algorithm, by using a loss function after connecting the deep neural network model and the speaker embedding model.

In this case, the pre-processing step S110 may include a step of learning to remove the reverberation component from the received voice signal by using a weighted prediction error (WPE) dereverberation algorithm using a deep neural network and a step of learning to remove the noise component from the received voice signal by using a minimum variance distortionless response (MVDR) beamformer using a deep neural network. Accordingly, the step S130 of performing the joint training may perform the joint training by using the loss function after connecting the WPE dereverberation algorithm using a deep neural network, the MVDR beamformer using a deep neural network, and the speaker embedding model based on a deep neural network.

Embodiments relate to a method for optimizing deep neural network models at a front end and a back end at a time on the basis of the same loss function by using a gradient descent algorithm used to train a deep neural network. The beamforming and dereverberation algorithms using a deep neural network may be used at the front end. An x-vector model, that is, the speaker embedding model based on a deep neural network, may be used at the back end. Accordingly, the deep neural network model and the x-vector model for speaker embedding included in the beamforming and dereverberation algorithms can be jointly trained by using a loss function suitable for speaker embedding. As a result, performance of speaker verification can be maximized by training all the deep neural network models in a way suitable for speaker verification.

Each of the steps of the joint training method using feature enhancement based on a deep neural network and a modified loss function for speaker recognition robust against noise environments according to an embodiment is described by taking it as one example.

The joint training method using feature enhancement based on a deep neural network and a modified loss function for speaker recognition robust against noise environments according to an embodiment may be more specifically described using a joint training apparatus using feature enhancement based on a deep neural network and a modified loss function for speaker recognition robust against noise environments according to an embodiment.

Figure 2:
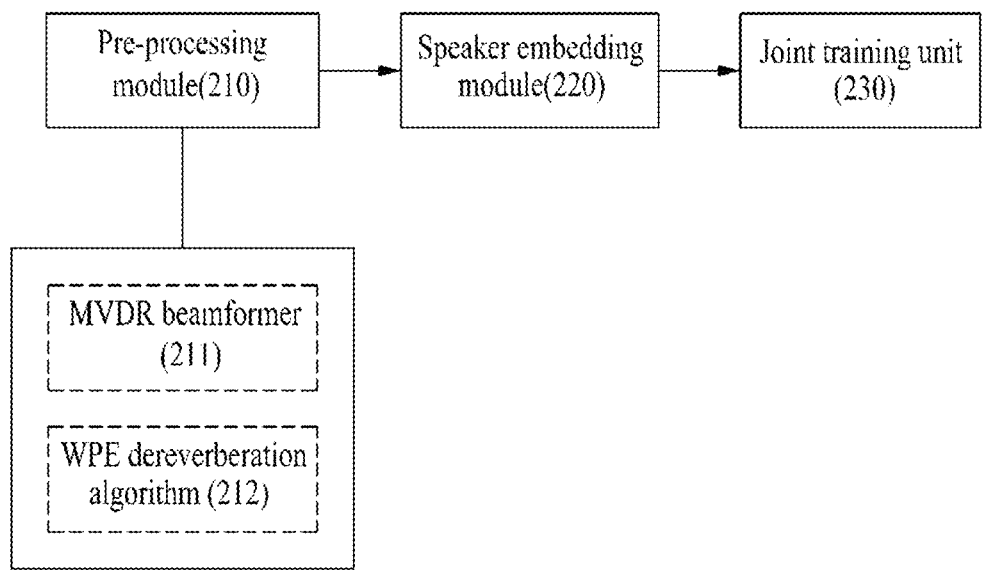
FIG. 2 is a block diagram illustrating a joint training apparatus using feature enhancement based on a deep neural network and a modified loss function for speaker recognition robust against noise environments according to an embodiment.

FIG. 2 is a block diagram illustrating a joint training apparatus using feature enhancement based on a deep neural network and a modified loss function for speaker recognition robust against noise environments according to an embodiment.

Referring to FIG. 2, the joint training apparatus 200 using feature enhancement based on a deep neural network and a modified loss function for speaker recognition robust against noise environments according to an embodiment may include a pre-processing module 210, a speaker embedding module 220 and a joint training unit 230. According to an embodiment, the pre-processing module 210 may include an MVDR beamformer 211 and a WPE dereverberation algorithm 212.

In the pre-processing step S110, the pre-processing module 210 may be trained to receive a voice signal and to remove a noise or reverberation component by using at least one of the beamforming algorithm and the dereverberation algorithm using a deep neural network. The pre-processing module 210 may transform short-time Fourier transform (STFT) coefficients of a microphone input signal, degraded by noise and reverberation, into STFT coefficients from which noise or reverberation has been removed when the microphone input signal passes through the beamforming algorithm or the dereverberation algorithm using a deep neural network.

In the speaker embedding step S120, the speaker embedding module 220 may be trained to classify speakers in the voice signal from which a noise or reverberation component has been removed by using the speaker embedding model based on a deep neural network. In particular, the speaker embedding module 220 may be trained to classify speakers in a sequence of acoustic features extracted from utterance having a given length by using the x-vector model, that is, the speaker embedding model based on a deep neural network. In this case, the speaker embedding module 220 may be trained using a cross-entropy loss function in a way to classify the speakers within the voice signal in the output layer of the x-vector model. The speaker embedding module 220 may extract a Mel filterbank energies (MFBE) feature to be used for an input to the speaker embedding model based on a deep neural network from the STFT coefficients from which noise or reverberation has been removed by using a Mel-filter bank (MFB).

In the step S130 of performing the joint training, the joint training unit 230 may joint-train the deep neural network model and the speaker embedding model based on a deep neural network for speaker embedding, included in at least one of the beamforming algorithm and the dereverberation algorithm, by using a loss function after connecting the deep neural network model and the speaker embedding model. In this case, the joint training unit 230 may joint-train the deep neural network model and the speaker embedding model by using the loss function defined in the output layer of the x-vector model. The joint training unit 230 may perform the joint training in a way to transmit the extracted MFBE feature to the input layer of the speaker embedding model based on a deep neural network, to connect a pre-processing portion and a speaker embedding portion, and to classify speaker IDs of respective pieces of utterance through the joint training.

For example, the pre-processing module 210 may be trained to remove a noise component from a received voice signal by using a minimum variance distortionless response (MVDR) beamformer using a deep neural network. Accordingly, the joint training unit 230 may perform joint-training by using a loss function after connecting the MVDR beamformer 211 using a deep neural network and the speaker embedding model based on a deep neural network.

For another example, the pre-processing module 210 may be trained to remove a reverberation component from a received voice signal by using a weighted prediction error (WPE) dereverberation algorithm using a deep neural network. Accordingly, the joint training unit 230 may perform joint-training by using a loss function after connecting the WPE dereverberation algorithm 212 using a deep neural network and the speaker embedding model based on a deep neural network.

Furthermore, for another example, the pre-processing module 210 may include the WPE dereverberation algorithm using a deep neural network, which is trained to remove a reverberation component from a received voice signal, and the MVDR beamformer using a deep neural network, which is trained to remove a noise component from a received voice signal. Accordingly, the joint training unit 230 may joint-train the WPE dereverberation algorithm 212 using a deep neural network, the MVDR beamformer 211 using a deep neural network, and the speaker embedding model based on a deep neural network by using a loss function after connecting the WPE dereverberation algorithm 212, the MVDR beamformer 211, and the speaker embedding model.

In an environment in which background noise and reverberation are present using the joint training method and apparatus with the speaker embedding model using the MVDR beamformer 211 and the WPE dereverberation algorithm 212 according to embodiments, if voices are collected through multiple microphones and processed, performance of speaker recognition when a voice degraded by background noise is received can be improved in an artificial intelligence speaker used in a household environment, a robot used in an airport, a speaker recognition system of a portable terminal used in an outside environment, etc. Furthermore, the joint training method and apparatus according to embodiments may also help to design a voice recognizer robust against noise environments because the joint training method and apparatus can be used to train an acoustic model trained to classify states of phonemes. The joint training method and apparatus using feature enhancement based on a deep neural network and a modified loss function for speaker recognition robust against noise environments are described in detail below.

Signal Model

Assuming that voice signals are collected through D microphones within a room in which background noise and reverberation are present, a voice signal input to the microphone may be represented as the sum of a voice signal having reverberation and background noise having reverberation, and may be indicated as in the following equation.

$$y_{t,f} = x_{t,f} + n_{t,f} = x_{t,f}^{(early)} + x_{t,f}^{(late)} + n_{t,f}^{(early)} + n_{t,f}^{(late)} \quad [\text{Equation 1}]$$

wherein x and n indicate short-time Fourier transform (STFT) coefficients of a voice signal degraded by reverberation and a noise signal degraded by reverberation, respectively. t and f mean a time frame index and a frequency-bin index, respectively. y means a microphone input signal to which the voice signal and the noise signal are added.

Furthermore, upper subscripts "(early)" and "(late)" mean an early reflection signal and a late reverberation signal, respectively. The former indicates a signal convoluted using up to only a portion 50 ms spaced apart from a main peak of a room impulse response (RIR) when a source signal is convoluted with the RIR. The latter indicates a signal convoluted by the remaining portion of the RIR. That is, the late reverberation signal is a source signal degraded by a tail portion of the RIR that continues relatively long, and may be considered as an unwanted reverberation component. The early reflection signal is a source signal degraded by a front portion of the RIR that is relatively short, and may be considered to be sufficiently permissible degradation.

MVDR Beamformer 211 Using Deep Neural Network of Pre-Processing Module 210

A common minimum variance distortionless response (MVDR) beamforming technology has an object of minimizing residual noise power remained in an output signal by making distortionless an output voice signal to which beamforming has been applied. If such a minimization problem is solved, a MVDR gain, such as that in the following equation, may be obtained.

$$W_{MVDR} = \frac{\Phi_{nn}^{-1}\Phi_{xx}}{tr(\Phi_{nn}^{-1}\Phi_{xx})}u_{ref} \quad \text{[Equation 2]}$$

wherein $\Phi_{xx}$ and $\Phi_{nn}$ indicate power spectral density (PSD) matrices of a voice component and a noise component, respectively. uref indicates a one-hot vector for selecting an output channel. In [Equation 2], a frequency-bin index f has been omitted for readability.

The output of the MVDR beamformer may be obtained by multiplying the MVDR gain and the microphone input signal, and may be indicated as in the following equation.

$$\hat{x}_{t,f} = W_{MVDR}^H y_{t,f} \quad \text{[Equation 3]}$$

wherein $\hat{x}_{t,f}$ means a beamformer output voice signal in a time-frequency (TF) bin index (t, In contrast, in the beamformer using a deep neural network, a portion of the existing common beamformer algorithm may be substituted with logic using a deep neural network. In the present embodiment, a spectral mask-based MVDR beamformer is used. The spectral mask-based MVDR beamformer may estimate spectral masks of a voice component and a noise component for each TF bin by using a deep neural network, and may calculate positive semi-definite (PSD) matrices of the voice component and the noise component by using the estimated masks.

In this case, since the mask estimation is independently performed on each of microphone channels, masks having the same number as the number of microphones may be calculated with respect to each of the voice component and the noise component. In order for a value of the mask to be between 0 and 1, a model may be designed using a sigmoid function so that an output value appears between 0 and 1 in the output layer of a deep neural network for mask estimation. In order to train a deep neural network for such mask estimation, a mean squared error (MSE) between a mask estimated through a neural network and a previously prepared target mask needs to be minimized. In this case, an ideal binary mask (IBM) is used as the target mask. A calculation method may be represented as in the following equation.

$$M_{d,t,f}^{(v)} = \begin{cases} 1, & \frac{|x_{d,t,f}^{(early)}|^2}{|x_{d,t,f}^{(late)} + n_{d,t,f}|^2} \begin{matrix} > \\ < \end{matrix} \theta_f^{(v)}, v \in \{x, n\} \\ 0, & \text{otherwise} \end{cases} \quad \text{[Equation 4]}$$

wherein d may indicate a microphone channel index. v may indicate a signal component corresponding to a voice component or a noise component. $\theta_f^{(v)}$ may indicate a threshold in the frequency-bin index f. $M_{d,t,f}^{(v)}$ may indicate the IBM in a TF bin (t, f) among STFT coefficients of a d-th microphone input signal.

That is, two output layers of a deep neural network for mask estimation may be constructed because spectral masks corresponding to the voice component and the noise component are respectively estimated. When the training of the deep neural network for mask estimation is finished, PSD matrices of the voice component and the noise component signal may be estimated using the following equation.

$$\Phi_w = \sum_t \hat{M}_{t,f}^{(v)} y_{t,f} y_{t,f}^H \Big/ \sum_t \hat{M}_{t,f}^{(v)}, v \in \{x, n\} \quad \text{[Equation 5]}$$

wherein $\hat{M}_{t,f}^{(v)}$ is a mean mask obtained by averaging estimated values of the masks for each microphone channel with respect to all the channels through a deep neural network.

An MVDR gain may be obtained by putting, into [Equation 2], the PSD matrix obtained as described above. A framework that performs beamforming by using the MVDR gain may be called mask-based MVDR beamforming based on a deep neural network. The deep neural network for mask estimation is trained to receive log-scale power spectra (LPS) calculated from the microphone input signal and to estimate the IBM in [Equation 4]. The training may be performed using, as a loss function, a binary cross-entropy loss between an output value of the output layer and the IBM defined in [Equation 4].

WPE Dereverberation Algorithm 212 Using Deep Neural Network of Pre-Processing Module 210

In the existing weighted prediction error (WPE) dereverberation technology, a linear prediction filter for estimating a late reverberation component of an input signal may be estimated. A maximum likelihood (ML) estimated value of an early reflection signal may be obtained by subtracting, from the input signal, the late reverberation component estimated through the linear prediction. Coefficients of the linear prediction filter need to be estimated in an iterative way because a closed form solution for estimating the linear prediction filter is not present, and a process of estimating the coefficients may be represented as in the following equation.

Step 1) [Equation 6]

$$\lambda_{t,f} = \frac{1}{D}\sum_d |x_{d,t,f}^{(early)}|^2$$

Step 2) [Equation 7]

$$R_f = \sum_f \frac{\tilde{y}_{t-\Delta,f}\tilde{y}_{t-\Delta,f}^H}{\lambda_{t,f}} \in C^{DK \times DK}$$

[Equation 8]

$$P_f = \sum_t \frac{\tilde{y}_{t-\Delta,f} y_{t,f}^H}{\lambda_{t,f}} \in C^{DK \times D}$$

[Equation 9]

$$G_f = R_f^{-1} P_f \in C^{DK \times D}$$

Step 3) [Equation 10]

$$\hat{x}_{x,f}^{(early)} = y_{x,f} - G_f^H \tilde{y}_{t-\Delta,f}$$

wherein $\hat{x}_{d,t,f}^{(early)}$ indicates an estimated value of the early reflection signal estimated through a linear prediction scheme. $\lambda_{t,f}$ indicates power in the TF bin (t, f) of the estimated early reflection signal. K indicates an order of the linear prediction filter. Δ indicates delay of the linear prediction algorithm. $\tilde{y}_{t-\Delta,f}$ and G indicate stacked representations of STFT coefficients and linear prediction filter coefficients of the microphone input signal, which are stacked from the past Δ-th frame to the past (Δ+K−1)-th frame on the basis of a current frame "t."

In contrast, in weighted prediction error (WPE) dereverberation using a deep neural network, a portion of the existing common WPE algorithm may be substituted with logic using a deep neural network. More specifically, a portion that estimates power of the early reflection signal in [Equation 6] is substituted with a deep neural network. In this case, the deep neural network may be trained to receive power of the microphone input signal $x_{d,t,f}+n_{d,t,f}$ and to estimate power of a $x_{d,t,f}^{(early)}+n_{d,t,f}^{(early)}$ component from which a late reverberation component has been removed. This has an object of removing late reverberation from both a voice component and a noise component, and may be called a method of training a deep neural network.

When the training of the deep neural network is finished, a power estimated value of an early reflection signal may be calculated for each microphone channel by using the deep neural network. A power estimated value which may substitute the left side of [Equation 6] may be calculated by taking the mean with respect to all the channels. The STFT coefficients of the early reflection signal may be estimated through the processes of [Equation 7] to [Equation 10]. The deep neural network for estimating power of the early reflection signal is trained to minimize a mean squared error (MSE) between the estimated power of the early reflection signal and answer early reflection power. LPS obtained by transforming the power in a log scale by taking a log into the power is used for real input and output. When the LPS are applied to the WPE algorithm, the LPS may be transformed in a linear scale again through an exponential operation and applied.

Speaker Embedding Model Based on Deep Neural Network of Speaker Embedding Module 220

The speaker embedding model based on a deep neural network may be trained to receive a sequence of acoustic features having a given length and to classify speakers in an utterance unit. Mel filterbank energies (MFBE), Mel-frequency cepstral coefficients (MFCC), etc. may be chiefly used as the acoustic features.

In this case, the x-vector model, that is, a recently proposed representative speaker embedding model based on a deep neural network, is used. The x-vector model plays a role to extract information related to a speaker through a non-linear operation from a sequence of acoustic features having a frame unit arranged in a time order by using five time-delay neural network (TDNN) layers, and may play a role to calculate the mean and standard deviation of the sequence of acoustic features in a time axis in a statistics feature extraction (statistics pooling) layer located next to the TDNN layer and to extract a vector having a fixed length from utterance having a given length by jointing the mean and the standard deviation.

After the mean and standard deviation vectors calculated as described above additionally experience two hidden layers, the x-vector model may be trained to finally classify speakers within a training dataset in the output layer by using a cross-entropy loss function. That is, the x-vector model is trained to classify speakers in the sequence of acoustic features extracted from utterance having a given length. Accordingly, such a method is a method of learning a feature space in which information of a speaker may be divisionally represented in the hidden layer. The loss function used to train the speaker embedding model may be represented as in the following equation.

$$L_x \frac{1}{N}\sum_{n=1}^{N} -\log(p_{y_n}) \text{ where } p_{y_n} = \frac{\exp(s_{y_n})}{\sum_{j=1}^{C}\exp(s_j)} \quad \text{[Equation 11]}$$

wherein C is the number of speakers within a training database. $S_j$ is an output value of a neural network calculated at the location of a j-th speaker among nodes of the output layer. $P_j$ is a value to which a probabilistic meaning has been assigned by applying a softmax function to $S_j$. Furthermore, $y_n$ is an index indicative of a speaker of an n-th training data sample that constitutes a mini-batch.

After the training is finished, an output value before passing through an active function of a hidden layer located next to a statistical feature extraction layer may be used as an x-vector, that is, a speaker feature vector.

Joint Training Unit 230

Most of operations of the MVDR beamforming algorithm and the WPE dereverberation algorithm using a deep neural network are fully differentiable operations. Accordingly, after such operations are connected to the x-vector model at the back end, the entire system may be joint-trained.

More specifically, when STFT coefficients of a microphone input signal degraded by noise and reverberation pass through the MVDR beamformer or the WPE dereverberation algorithm using a deep neural network, the STFT coefficients are transformed into STFT coefficients from which noise or reverberation has been removed. A power spectrum may be calculated from the STFT coefficients from which noise or reverberation has been removed. Furthermore, a pre-processing portion and a speaker embedding portion may be connected in a way to extract an MFBE feature to be used as an input to the x-vector model by using a Mel-filter bank (MFB) and to transmit the extracted MFBE feature to the input layer of the x-vector model.

Joint training may be performed by connecting the MVDR/WPE and x-vector models by using the aforementioned method after individual training of the x-vector model and the deep neural network models constituting the MVDR beamformer or the WPE dereverberation algorithm is completed and by using, as a loss function, a loss function defined in the output layer of the x-vector model. This has a meaning that corresponding pre-processing modules are trained to be suitable for speaker embedding, that is, the final object, by deviating from a loss function used to individually train the MVDR/WPE using a deep neural network.

That is, deep neural networks of a pre-processing portion are transformed to be more suitable for speaker embedding through joint training with the speaker embedding model. A method of joint-training the WPE dereverberation algorithm using a deep neural network and a classification model, such as an x-vector, has not yet been proposed. In particular, in the speaker recognition field, research of joint training of the MVDR beamforming and WPE dereverberation algorithms using a deep neural network and the speaker embedding model based on a deep neural network, such as an x-vector, has not been proposed.

Meanwhile, if the pre-processing module is constructed using a method of performing beamforming after WPE dereverberation, a reverberation component may be first removed from a microphone input signal degraded by noise and reverberation, and a noise component may be then removed through the beamformer. Such a method is more effective than a method of first removing noise and then removing reverberation, and is more effective than a method of removing only noise through the beamformer or removing only reverberation through WPE. Accordingly, in the present embodiment, after a total of the three modules are combined in order of WPE dereverberation, the MVDR beamformer and the x-vector speaker embedding, joint training may be performed.

Both the MVDR beamforming and WPE dereverberation algorithms include operations for processing STFT coefficients having complex number values. Accordingly, in order to actually implement joint training, it is necessary to separately operate a real part and imaginary part of a complex number. In particular, an inverse operation of a complex number matrix illustrated in [Equation 2] and [Equation 9] may be solved through the following equations.

$$R(C^{-1}) = (A + BA^{-1}B)^{-1} \quad \text{[Equation 12]}$$

$$J(C^{-1}) = -(A + BA^{-1}B)^{-1} BA^{-1} \quad \text{[Equation 13]}$$

In this case, $C = A + iB$ is a complex number matrix. A and B are real number matrices in which inverse matrices are present, respectively.

Figure 3:
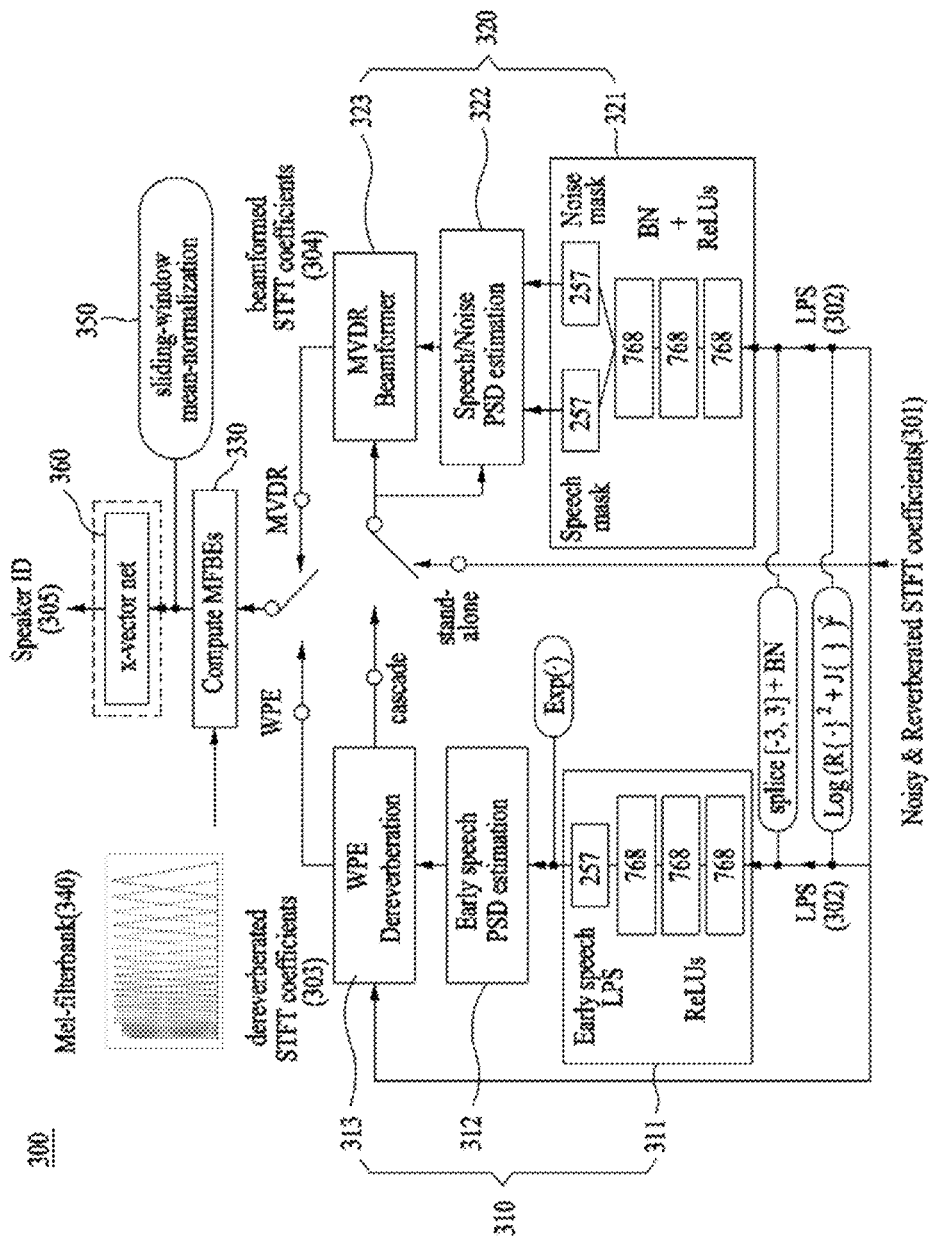
FIG. 3 is a diagram illustrating a system configuration of the joint training apparatus using feature enhancement based on a deep neural network and a modified loss function for speaker recognition robust against noise environments according to an embodiment.

FIG. 3 is a diagram illustrating a system configuration of the joint training apparatus using feature enhancement based on a deep neural network and a modified loss function for speaker recognition robust against noise environments according to an embodiment.

FIG. 3 illustrates the system configuration 300 of the joint training apparatus using feature enhancement based on a deep neural network and a modified loss function for speaker recognition robust against noise environments, and comprehensively illustrates the system configuration used in experiments of the present embodiment. First, STFT coefficients 301 calculated from a microphone input signal contaminated by noise and reverberation may be used as an input. When the middle of FIG. 3 is viewed as a basis, the left illustrates the structure of the WPE algorithm 310 using a deep neural network, and the right illustrates the structure of the MVDR beamforming algorithm 320 using a deep neural network.

The deep neural networks are a deep neural network 311 for estimating LPS of an early reflection signal and a deep neural network 321 for estimating a mask, respectively, may use LPS 302 calculated from the STFT coefficients, and may concatenate and use LPS 302 extracted from a third frame in the past to a third frame in the future. Output values of the deep neural networks are calculated through equations of the WPE dereverberation 313 and the MVDR beamformer 323 for estimating PSD matrices 312 and 322, respectively. STFT coefficients 303 and 304 from which a noise component or a reverberation component has been removed may be calculated from the STFT coefficients 301 of the microphone input signal, respectively, through the aforementioned equations.

In FIG. 3, an upper switch is used to distinguish between a case where WPE is used and a case where MVDR is used. A lower switch is used to distinguish between a case where WPE or MVDR is solely used and a case where a cascade structure to which MVDR is applied after WPE is applied. For example, if the switch is placed in cascade-WPE, the switch may mean a structure to which MVDR beamforming is applied after WPE. MFBE features for training the x-vector model are extracted (330) from the STFT coefficients 303 and 304, which are obtained after pre-processing is performed as described above and from which a noise component or a reverberation component has been removed. In this case, a previously calculated Mel-filterbank (MFB) 340 may be used. Sliding-window mean normalization 350 may be applied to the MFBE features by using a window having a length of three seconds. The MFBE features may be input to the x-vector model 360. The x-vector model may be trained to classify speaker IDs 305 of respective pieces of utterance constituting a mini-batch.

An experiment method of the joint training method and apparatus using feature enhancement based on a deep neural network and a modified loss function for speaker recognition robust against noise environments according to an embodiment is described below.

All experiments were performed using an SiTEC Korean voice database (DB). The SiTEC DB included a clean voice signal sampled at 16 kHz. Each of speakers included about 103 to 105 pieces of utterances. The mean length of the utterances was about 5.18 second. For the experiments, the DB was divided into two datasets. A dataset for training included 84,103 pieces of utterance collected from 800 speakers. A dataset for evaluation included every 25 pieces of utterance with respect to 200 speakers.

In order to generate a multi-channel voice signal contaminated by noise and reverberation, an RIR was generated by simulating various room environments using an RIR generator toolkit for generating an RIR in a specific room environment through simulations. 5,000 RIRs to be applied to the dataset for training and 1,000 RIRs to be applied to the dataset for evaluation were prepared. A room environment was randomly set according to the setting of the following table in order to set the room environment for generating RIRs.

Table 1 illustrates the setting of an RIR generator parameter for generating

TABLE 1

| Parameter | | Value |
| --- | --- | --- |
| Room size | small | $[4 \times 4 \times 2]m^3$ to $[10 \times 10 \times 5]m^3$ |
| | medium | $[10 \times 10 \times 2]m^3$ to $[30 \times 30 \times 5]m^3$ |
| Microphone array | | 2 mics with 9.5 cm of spacing |
| Source-Receiver dist. | | 0 m to 4 m |
| RT60 | | 0.3 sec to 0.8 sec |

The RIRs were generated every four sets for each room. Each of the sets included one RIR to be convoluted with a voice signal source and one to three RIRs to be convoluted with a noise signal source.

Data of a domestic audio tagging task in the detection and classification of acoustic scenes and events (DCASE) challenge held in 2016 was used as the noise signal. The corresponding data included a child/adult voice, a video game sound, a TV sound, an impact sound, etc. which may occur in a room environment in a home. For training and evaluation, a total of 6,137 samples were divided into 4,091 samples and 2,046 samples, and were randomly added to a voice dataset for training and a voice dataset for evaluation. A signal-to-noise ratio (SNR) when the samples were added was randomly selected between 0 dB and 20 dB. That is, with respect to any one clean voice signal, an RIR was randomly selected and degraded to have a reverberation component. A noise sample was randomly selected and degraded, and a voice degraded by noise and reverberation was generated by adding a voice degraded by reverberation and noise. When trained, the deep neural networks need to be trained by binding a multi-channel voice signal in a mini-batch unit. In particular, if all of WPE, MVDR, and the x-vector model using deep neural networks are joint-trained, when the size of the mini-batch is too large, the joint-training is impossible because the capacity of a GPU memory is insufficient. Accordingly, in the present experiments, only two-channel voice data was generated, and the experiments were performed.

In addition to the RIRs generated through simulations as described above, in order to perform experiments by using an actually recorded RIR, a real RIR included in an REVERB Challenge 2014 dataset was also used for the experiments. The corresponding dataset was recorded through a total of eight microphones. Accordingly, in the experiments, only RIRs recorded by Nos. 1 and 5 microphones were used.

A main object of the present experiments was the feasibility study of joint training, and thus a relatively simple model was used in the structures of the deep neural networks used in the MVDR and WPE algorithms based on deep neural networks. A feature vector generated by concatenating, into one vector, 257-dimensional LPS from a third frame in the past to a third frame in the future were used for both inputs to the deep neural network for mask estimation and the deep neural network for estimating the LPS of an early reflection signal. Three layers consisting of 768 rectified linear units (ReLU) were used as the hidden layer. The output layer of the deep neural network for mask estimation needed to estimate masks for voice and noise components, respectively, and thus was composed of two layers including 257 sigmoid units. The output layer of the deep neural network for LPS estimation included one layer composed of 257 linear units. The MVDR and WPE algorithms operated in a batch mode to process pieces of utterance altogether. Linear prediction parameters of the WPE algorithm were set as A=3 K=10.

The x-vector speaker embedding model at the back end received 24-dimensional MFBE. Mean normalization was applied to the MFBE by using a sliding window having a length of three seconds. The output layer was a softmax layer including 800 units having the same number as the number of speaker included in the training dataset.

Finally, in order to perform the joint training of all the deep neural network models, the present embodiment proposes a method of unifying some settings in the training process of all of the deep neural networks as follows. First, a frame length and a frame shift length were set to 32 ms and 8 ms, respectively. Such settings are settings chiefly used a lot in a pre-processing algorithm, such as beamforming or dereverberation, unlike settings of 25 ms and 10 ms a lot used in voice recognition or speaker recognition. Accordingly, the frame length was unified as setting a lot used in pre-processing because the pre-processing algorithm is more greatly influenced by the setting of the frame length compared to the speaker recognition model. Second, a method of setting a mini-batch for training the deep neural network model was unified based on a method of training the x-vector model at the back end. That is, one mini-batch includes multiple pieces of utterance. The pieces of utterance are cropped to have the same length and constitute a mini-batch. When cropped, the utterance is randomly cropped to have a length between 3 seconds and 8 seconds. Furthermore, after the training step is finished, when the model is used for evaluation, all of pieces of utterance are inputted to the deep neural network without any change without cropping the utterance. Third, an initial learning rate and the final learning rate used to train the deep neural network model were unified with respect to the training of all of the models.

All of the deep neural network models were trained using an Adam algorithm. The deep neural networks in a pre-processing portion were trained during 40 epochs by setting the size of a mini-batch to 32. The x-vector model was trained during 60 epochs by setting the size of a mini-batch to 64. The initial learning rate was set to 0.0001, and was decreased by 1/3 a total of three times during the training. A dropout was set to 20%. l2-regularization was applied to a weight matrix of the deep neural network model.

The joint training was performed during a total of 20 epochs. The initial learning rate used in the joint training was set as the final learning rate used in individual training. The size of the mini-batch in the joint training was set to 64. The size of the mini-batch was set to 52 only when all the three models of the MVDR, WPE, and the x-vector based on a deep neural network were joint-trained. 52 was a value set by considering the capacity of the GPU memory.

After the training was fully finished, speaker embedding (x-vector) was extracted using the x-vector model. A probabilistic linear discriminant analysis (PLDA) model used to calculate a speaker verification score was trained using x-vectors extracted from the training dataset. More specifically, a global mean x-vector was first extracted from the x-vectors extracted from the training dataset, thus obtaining a zero mean. 512-dimensional x-vectors were projected in a 200 dimension by using the LDA. Length normalization was performed so that l2-norm of the x-vector became 1. A two-covariance model, that is, one type of PLDA model, was trained using the results of the length normalization.

For evaluation, 60,000 target trials and 221,850 non-target trials were constructed using pieces of utterance included in the evaluation dataset. In this case, the target trial was a two-utterance pair whose speakers are the same, and the non-target trial was a two-utterance pair whose speakers are not the same. As a degree that speakers are identical is increased, a log likelihood ratio (LLR) calculated using the two-covariance model has a higher value. As the degree that speakers are identical is decreased, the LLR calculated has a lower value. A measure used in evaluation was an equal error rate (EER).

Table 2 illustrates EERs according to system configuration methods.

TABLE 2

| Model | simulated | real |
| --- | --- | --- |
| Unprocessed | 5.325 | 5.702 |
| $MVDR_{DNN}$ | 4.315 | 5.414 |
| $MVDR_{oracle}$ | 3.721 | 4.707 |
| $MVDR_{DNN}$ + JT | 3.955 | 4.892 |
| $WPE_{DNN}$ | 4.686 | 4.749 |
| $WPE_{oracle}$ | 4.807 | 4.769 |
| $WPE_{iterative}$ | 4.746 | 4.812 |
| $WPE_{DNN}$ + JT | 4.182 | 4.526 |
| $WPE_{DNN}$ + $MVDR_{DNN}$ | 3.733 | 4.538 |
| $WPE_{oracle}$ + $MVDR_{oracle}$ | 3.221 | 3.819 |
| $WPE_{DNN}$ + $MVDR_{DNN}$ + JT | 3.297 | 3.967 |

Table 2 is the results of a comparison between the EERs according to the system configuration methods. A column on the left among two columns illustrating the results illustrates the results of simulated RIRS. In Table 2, a subscript DNN means a pre-processing algorithm using a deep neural network. "oracle" means a pre-processing algorithm using an answer (IBM in the case of MVDR, LPS of an early reflection signal in the case of WPE), which is not estimated using a deep neural network. Furthermore, "iterative" means that the existing common WPE algorithm was used, and "JT" means joint training.

First, a case where the MVDR model was used is described. DNN MVDR (MVDR$_{DNN}$) and oracle MVDR (MVDR$_{oracle}$) show relative EER decreases of 19.0% and 30.1%, respectively, compared to a case where pre-processing was not applied (Unprocessed). It may be seen that performance of DNN MVDR was further improved by 6.7% due to joint training (JT).

In contrast, DNN WPE (WPE$_{DNN}$) shows a relative EER decrease of 12% compared to a case where pre-processing was not applied (Unprocessed), and shows slightly better performance than oracle WPE (WPE$_{oracle}$) and iterative WPE (WPE$_{iterative}$). It is estimated that linear prediction parameters used in the WPE algorithm was not optimal or target (oracle) LPS of a deep neural network for LPS estimation was sufficiently suitable for an object for training, but was not sufficiently suitable for being used in the WPE algorithm without any change. A case where up to joint training was performed on DNN WPE has the best performance among the WPE models, and shows significantly improved performance compared to the remaining WPE models.

When comparing performance of MVDR and performance of WPE, it may be seen that performance of the MVDR model is better. The MVDR model was designed to remove a reverberation component to some extent while removing a noise component according to [Equation 4]. In contrast, the WPE algorithm is an algorithm originally designed to remove only a reverberation component. For this reason, a case where MVDR is solely used generally has better performance than a case where WPE is solely used. However, WPE shows no a great difference in performance although an answer (oracle) is used, whereas MVDR has a great difference in performance between a mask estimated using a DNN and an oracle mask. Accordingly, it may be seen that WPE is further robust against a mismatch.

Finally, the results of a cascade structure (WPE+MVDR) using both WPE and MVDR are described. It may be seen that both the DNN and oracle have significantly improved performance compared to a case where WPE or MVDR is solely used. According to the previously analyzed results, most of a difference in performance between the DNN and oracle in the cascade structure seems to be a difference in performance which chiefly appears in MVDR. Such a difference in performance between the DNN and oracle was overcome up to about 85.2% through joint training.

Furthermore, to analyze differences in the simulation experiment RIR and the real RIR was concentrated because the results of experiments of the real RIR had a similar aspect to those of the simulation experiment RIR. First, when comparing performance of the MVDR models, it may be seen that performance in the real RIR relatively decreased to 23.7% to about 26.5% compared to performance in the simulation experiment RIR. A main cause of the performance decrease seems to be a mismatch between the real RIR and the simulation experiment RIR.

In contrast, it may be seen that the WPE algorithm had a very small performance decrease although evaluation was performed in the real RIR. DNN WPE and iterative WPE showed performance decreases of 1.3% and 1.4%, respectively. If joint training was applied, a relative performance decrease was 8.2%. The reason why the performance decrease in the WPE model on which joint training was performed was relatively larger than a performance decrease in another WPE model is that a mismatch degree with the real RIR was further increased because up to the x-vector model at the back end was more fitted into a simulation experiment RIR environment in the joint training process. Oracle WPE had slightly improved performance in the real RIR. This looks like results appeared because the number of real RIRs used in the experiments was too small. As a result, a WPE model to which joint training was applied among the WPE models had the best performance even in the real RIR. Unlike in the results in the simulation experiment RIR, the WPE model to which the joint training was applied showed better performance than sole MVDR pre-processing in the real RIR. The reason for this is that MVDR had relatively greatly decreased performance due to a mismatch between the simulation experiment RIR and the real RIR, whereas WPE showed a relatively very small performance decrease.

Finally, cascade structures to which WPE and MVDR were sequentially applied showed performance decreases of relatively 18.6% to 21.6%. When viewed from the previous results, a main cause of the performance decrease may be considered to occur due to MVDR rather than WPE. Similarly to the results in the simulation experiment RIR, a performance difference between oracle and the DNN was overcome by 79.4% through joint training.

As described above, embodiments relate to a method of configuring a robust speaker verification system by using a multi-channel voice signal collected using several microphone in an environment in which background noise and reverberation are present. The corresponding system includes the pre-processing module at the front end and the speaker embedding module at the back end.

Embodiments can improve performance of a speaker recognizer by being applied to an artificial intelligence speaker, a robot, a portable terminal type user authentication system, a user authentication system for fraud prevention in a banking call center, a smartphone application including a speaker recognition function, etc. in which speaker recognition in an environment in which background noise and reverberation are present, and can improve a voice recognition rate by identically applying the method according to embodiments when combining an acoustic model for voice recognition and beamforming and dereverberation technologies using a deep neural network.

The aforementioned apparatus may be implemented by a hardware component, a software component or a combination of a hardware component and a software component. For example, the apparatus and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other apparatus capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, a different processing configuration, such as a parallel processor, is also possible.

Software may include a computer program, a code, an instruction or a combination of one or more of them and may configure a processing apparatus so that the processing apparatus operates as desired or may instruct the processing apparatuses independently or collectively. The software and/or the data may be embodied in any type of machine, a component, a physical apparatus, a computer storage medium or an apparatus in order to be interpreted by the processor or to provide an instruction or data to the processing apparatus. The software may be distributed to computer systems connected over a network and may be stored or executed in a distributed manner. The software and the data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instruction stored in the medium may be specially designed and constructed for an embodiment, or may be known and available to those skilled in the computer software field. Examples of the computer-readable medium include magnetic media such as a hard disk, a floppy disk and a magnetic tape, optical media such as a CD-ROM and a DVD, magneto-optical media such as a floptical disk, and hardware apparatuses specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, apparatus, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A joint training method using feature enhancement based on a deep neural network and a modified loss function for speaker recognition robust against noise environments, the joint training method being performed by a joint training apparatus implemented by a computer system, the joint training method comprising:
a pre-processing step of receiving, by a pre-processing module of the joint training apparatus, a voice signal and learning to remove a noise or reverberation component by using at least one of a beamforming algorithm and a dereverberation algorithm using the deep neural network;
a speaker embedding step of learning, by a speaker embedding module of the joint training apparatus, to classify speakers in the voice signal from which a noise or reverberation component has been removed by using a speaker embedding model based on the deep neural network; and
a step of joint-training, by a joint training unit of the joint training apparatus, the deep neural network model and the speaker embedding model based on the deep neural network for speaker embedding, which are included in at least one of the beamforming algorithm and the dereverberation algorithm, by using a loss function after connecting the deep neural network model and the speaker embedding model,
wherein the pre-processing module is at a front-end and is configured to learn to remove a noise or reverberation component noise, the speaker embedding module is at a back end where the pre-processing module is combined and is configured to learn to classify speakers in the voice signal from which a noise or reverberation component has been removed, and the pre- processing module comprises a WPE dereverberation algorithm using the deep neural network including fully differentiable operations or a MVDR beamformer using the deep neural network, and is connected to the speaker embedding module comprising a x-vector model at the back end, and deep neural network models at the front end and the back end are joint-trained with the same loss function,
wherein the MVDR beamformer using the deep neural network comprises a spectral mask-based MVDR beamformer, estimates spectral masks of a voice component and a noise component for each TF bin with respect to each of microphone channels by using the deep neural network, calculates a power spectral density (PSD) matrices of a voice component and a noise component using the spectral masks, learns the deep neural network for estimating the spectral masks with a binary cross-entropy loss, as a loss function, between spectral masks estimated using the deep neural network and Ideal Binary Mask (IBM), calculates a MVDR gain based on the power spectral density (PSD) matrices, and performs beamforming by using the MVDR gain,
wherein the speaker embedding step comprises learning to classify the speakers in a sequence of acoustic features extracted from utterance having a given length by using the x-vector model being the speaker embedding model based on the deep neural network, and learning the speaker embedding model using a cross-entropy loss function in a way to classify the speakers within a voice signal in an output layer of the x-vector model,
wherein the step of joint training comprises joint training by using a loss function defined in the output layer of the x-vector model,
wherein the pre-processing step comprises transforming, into short-time Fourier transform (STFT) coefficients from which noise or reverberation has been removed, STFT coefficients of a microphone input signal degraded by the noise and reverberation when the microphone input signal passes through the beamforming algorithm or the dereverberation algorithm using the deep neural network,
wherein the speaker embedding step comprises extracting, from the STFT coefficients from which the noise or reverberation has been removed, a Mel filterbank energies (MFBE) feature to be used as an input to the speaker embedding model based on the deep neural network by using a Mel-filter bank (MFB), and
wherein the step of joint training comprises connecting a pre-processing portion and a speaker embedding portion by delivering the extracted MFBE feature to an input layer of the speaker embedding model based on the deep neural network, and performing the joint training in a way to classify speaker IDs of respective pieces of utterance through the joint training.

2. The joint training method of claim 1, wherein:
the pre-processing step comprises steps of:
learning to remove the reverberation component from the received voice signal by using a weighted prediction error (WPE) dereverberation algorithm using the deep neural network; and
learning to remove the noise component from the received voice signal by using a minimum variance distortionless response (MVDR) beamformer using the deep neural network, and
the step of joint training comprises joint-training the WPE dereverberation algorithm using the deep neural network, the MVDR beamformer using the deep neural network and the speaker embedding model based on the deep neural network by using the loss function after connecting the WPE dereverberation algorithm, the MVDR beamformer and the speaker embedding model.

3. A joint training apparatus using feature enhancement based on a deep neural network and a modified loss function for speaker recognition robust against noise environments, comprising:
a pre-processing module configured to receive a voice signal and trained to remove a noise or reverberation component by using at least one of a beamforming algorithm and a dereverberation algorithm using the deep neural network;
a speaker embedding module trained to classify speakers in the voice signal from which a noise or reverberation component has been removed by using a speaker embedding model based on the deep neural network; and
a joint training unit configured to joint-train the deep neural network model and the speaker embedding model based on the deep neural network for speaker embedding, which are included in at least one of the beamforming algorithm and the dereverberation algorithm, by using a loss function after connecting the deep neural network model and the speaker embedding model,
wherein the pre-processing module is at a front-end and is configured to learn to remove a noise or reverberation component noise, the speaker embedding module is at a back end where the pre-processing module is combined and is configured to learn to classify speakers in the voice signal from which a noise or reverberation component has been removed, and the pre- processing module comprises a WPE dereverberation algorithm using the deep neural network including fully differentiable operations or a MVDR beamformer using the deep neural network, and is connected to the speaker embedding module comprising a x-vector model at the back end, and deep neural network models at the front end and the back end are joint-trained with the same loss function,
wherein the MVDR beamformer using the deep neural network comprises a spectral mask-based MVDR beamformer, estimates spectral masks of a voice component and a noise component for each TF bin with respect to each of microphone channels by using the deep neural network, calculates a power spectral density (PSD) matrices of a voice component and a noise component using the spectral masks, learns the deep neural network for estimating the spectral masks with a binary cross-entropy loss, as a loss function, between spectral masks estimated using the deep neural network and Ideal Binary Mask (IBM), calculates a MVDR gain based on the power spectral density (PSD) matrices, and performs beamforming by using the MVDR gain,
wherein the speaker embedding modules learns to classify the speakers in a sequence of acoustic features extracted from utterance having a given length by using the x-vector model being the speaker embedding model based on the deep neural network, and learns the speaker embedding model using a cross-entropy loss function in a way to classify the speakers within a voice signal in an output layer of the x-vector model,
wherein the joint training unit joint trains by using a loss function defined in the output layer of the x-vector model,
wherein the pre-processing module transforms, into short-time Fourier transform (STFT) coefficients from which noise or reverberation has been removed, STFT coefficients of a microphone input signal degraded by the noise and reverberation when the microphone input signal passes through the beamforming algorithm or the dereverberation algorithm using the deep neural network,
wherein the speaker embedding module extracts, from the STFT coefficients from which the noise or reverberation has been removed, a Mel filterbank energies (MFBE) feature to be used as an input to the speaker embedding model based on the deep neural network by using a Mel-filter bank (MFB), and
wherein the joint training unit connects a pre-processing portion and a speaker embedding portion by delivering the extracted MFBE feature to an input layer of the speaker embedding model based on the deep neural network, and performs the joint training in a way to classify speaker IDs of respective pieces of utterance through the joint training.

4. The joint training apparatus of claim 3, wherein:
the pre-processing module comprises:
a weighted prediction error (WPE) dereverberation algorithm using the deep neural network, which is trained to remove the reverberation component from the received voice signal; and
a minimum variance distortionless response (MVDR) beamformer using the deep neural network, which is trained to remove the noise component from the received voice signal by using, and
the joint training unit joint-trains the WPE dereverberation algorithm using the deep neural network, the MVDR beamformer using the deep neural network and the speaker embedding model based on the deep neural network by using the loss function after connecting the WPE dereverberation algorithm, the MVDR beamformer and the speaker embedding model.

* * * * *